Jan. 12, 1937.　　　A. S. HOWELL　　　2,067,189
LENS MOUNT
Filed June 24, 1935
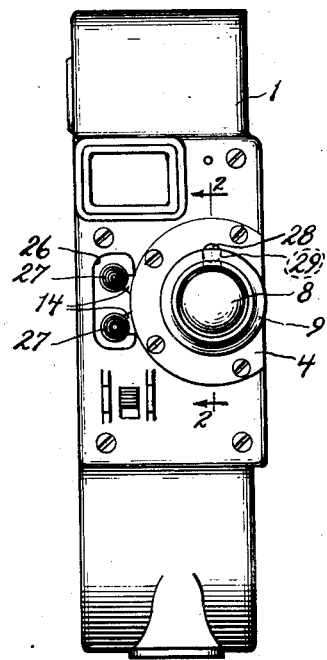
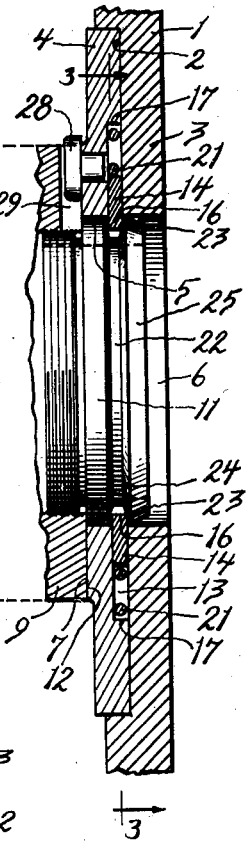
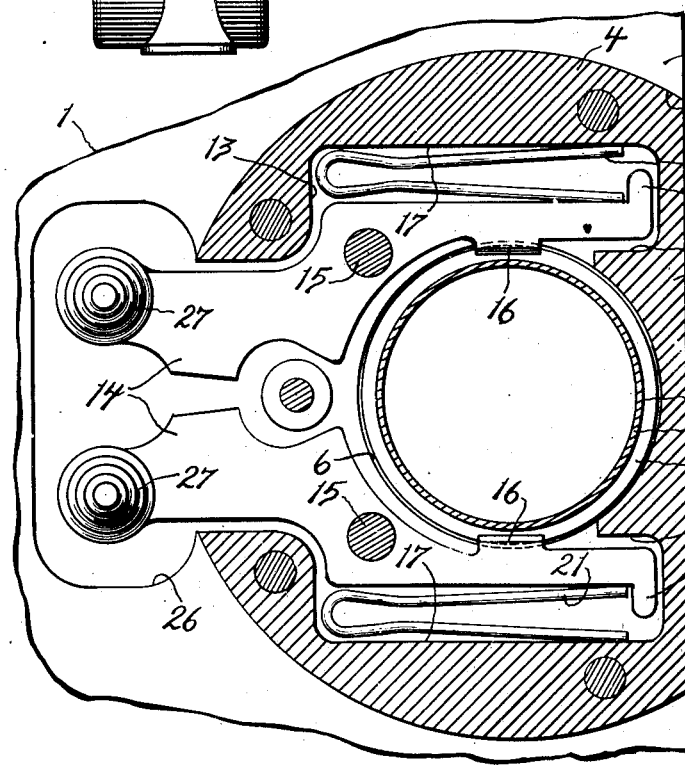
Inventor,
Albert S. Howell.
By Robert F. Miehle, Jr.
Atty.

Patented Jan. 12, 1937

2,067,189

UNITED STATES PATENT OFFICE 2,067,189

LENS MOUNT

Albert S. Howell, Chicago, Ill., assignor to The Bell & Howell Company, Chicago, Ill., a corporation of Illinois Application June 24, 1935, Serial No. 28,028

14 Claims. (Cl. 95—53)

My invention relates particularly to lens mounts for photographic cameras although not limited to this use alone.

The main feature of the invention resides in the provision of a novel and effective lens mount providing for the convenient mounting and dismounting of lenses on a base or mount member, particularly with a view toward the quick and convenient interchange of photographic lenses on photographic cameras.

With this feature in view my invention consists in certain features of novelty in the construction, combination, and arrangement of parts by which the said feature and certain other features, hereinafter appearing, are effected, all as fully described with reference to the accompanying drawing and more particularly pointed out in the appended claims.

In the said drawing—

Figure 1 is a front elevation of a motion picture camera embodying my invention;

Figure 2 is an enlarged partial section substantially on the line 2—2 of Figure 1; and Figure 3 is a likewise enlarged partial section substantially on the line 3—3 of Figure 2.

Referring to the drawing, I designates the enclosing casing of a motion picture camera, and secured in a recess in the front surface of the front wall 3 of the casing is a base or lens mount plate 4. See Figures 1 and 2.

The base plate 4 is provided with a lens aperture 5, and the front wall 3 of the casing is provided with a similar aperture 6 registering with the aperture 5. The base plate is provided with a forwardly facing lens seating surface 7 surrounding the lens aperture 5.

A photographic lens is indicated at 8 and includes a main lens barrel portion 9 into the rear portion of which is screwthreaded a shouldered extension barrel portion 11. See Figure 2.

The barrel portion 11 is adapted to engage in the lens aperture 5 of the base plate 4 and in the aperture 6 of the front wall 3 of the camera casing when the lens is mounted, and the rear surface of the barrel portion 9, designated at 12, forms a rearwardly facing shoulder disposed forwardly of the rear end of the lens barrel and engageable against the seating surface 7 of the base plate when the lens is mounted to axially position the lens.

The rear surface of the base plate 4 is recessed, as designated at 13, and arranged in this recess are two latch levers 14 which are intermediately pivoted on respective or vertically spaced studs 15, fixed on the base plate 4, for independent pivotal movement in a plane normal to the axis of the lens aperture 5 and of the lens when mounted. See Figures 2 and 3.

Corresponding ends of the latch levers 14 are disposed on opposite sides of the axis of the lens aperture 5, and are provided with latch formations 16 facing the axis of the lens aperture 5 and disposed diametrically opposite with respect thereto. The extreme ends of these corresponding ends of the latch levers 14 are disposed between side surfaces 17 of the recess 13 and opposing side surface shoulders 18 of this recess to limit pivotal movement of the latch levers, these extreme ends being provided with lateral extensions 19 to provide the desired limitation of movement.

Springs 21, of generally U-shape, are disposed within the recess 13 and, reacting on the side surfaces 17, engage the aforesaid corresponding ends of the latch levers 14 and yieldably urge the latch levers toward the axis of the lens aperture 5 to normally position the latch levers in latching or engaged position.

The rear lens barrel portion 11 of the lens is provided with a circumferential groove 22 disposed rearwardly of the shoulder surface 12 of the lens barrel and is so disposed that, when the lens is mounted on the base plate 4, the groove 22 lies in the plane of the latch members 14 for engagement by the latch formations 16 to releasably secure the lens on the base plate with the shoulder surface 12 of the lens engaged against the seating surface 7 of the base plate.

The rear surfaces of the latch formations 16 are preferably slanted forwardly in the direction of the axis of the lens aperture 5, as designated at 23, and the forwardly facing surface of the groove 22 is likewise preferably tapered forwardly in the direction of the axis of the lens barrel, as designated at 24, either or both providing a cam engagement adapted to maintain a pressure engagement between the shoulder surface 12 of the lens barrel and the lens seat 7.

The portion of the rear lens barrel portion 11 at the rear of the groove 22 is preferably tapered in the direction rearwardly and toward the axis of the lens, as designated at 25, so that the lens may be mounted by merely inserting the lens and exerting a rearward pressure thereon.

The front wall 3 of the camera casing is provided with a forwardly facing recess 26 into which the ends of the latch levers 14, opposite those on which the latch formations 16 are disposed, project and these projecting ends of the latch levers are provided with forwardly projecting knobs 27 for convenient engagement by a person's fingers to actuate the latch levers against the influence of the springs 21 for release of the latch formations and removal of a lens.

For the purpose of predeterminately angularly fixing the lens 8 in its mounting, a forwardly projecting stud 28 is fixed on the base plate 4, and, projecting forwardly from the lens seat 7, engages in a radial slot 29 on the shoulder surface 12 of the lens barrel. See Figure 2.

Having thus described my invention, I do not wish to be limited to the precise details described as changes may be readily made without departing from the spirit of my invention, but having thus described my invention, I claim as new and desire to secure by Letters Patent the following:

1. In a device of the character described the combination with a base member provided with a lens seat, of a lens barrel engageable on said seat and provided with an external latch recess formation, latch means associated with said base member and movable normal to the axis of the lens barrel to engage and disengage said recess formation, spring means yieldably urging said latch means into engaging position, and means whereby said latch means is manually operable into disengaging position.

2. In a device of the character described the combination with a base member provided with a lens aperture and a forwardly facing seating surface surrounding said aperture, of a lens barrel engageable in said aperture and provided with a rearwardly facing shoulder disposed forwardly of the rear end thereof and engageable against said seat, said lens barrel being provided with a circumferential groove disposed rearwardly from said shoulder, latch means associated with said base member and movable normal to the axis of the lens barrel to engage and disengage said groove and adapted to engage said groove on opposite sides of the barrel and having cam engagement with said groove, spring means yieldably urging said latch means into engaging position, and means whereby said latch means is manually operable into disengaging position.

3. In a device of the character described the combination with a base member provided with a lens aperture and a forwardly facing seating surface surrounding said aperture, of a lens barrel engageable in said aperture and provided with a rearwardly facing shoulder disposed forwardly of the rear end thereof and engageable against said seat, said lens barrel being provided with a circumferential groove disposed rearwardly from said shoulder, latch means associated with said base member and movable to engage and disengage said groove, and means predeterminately fixing said lens barrel angularly with reference to said base member when the lens barrel is mounted thereon.

4. In a device of the character described the combination with a base member provided with a lens aperture and a forwardly facing seating surface surrounding said aperture, of a lens barrel engageable in said aperture and provided with a rearwardly facing shoulder disposed forwardly of the rear end thereof and engageable against said seat, said lens barrel being provided with a circumferential groove disposed rearwardly from said shoulder, latch means associated with said base member and movable normal to the axis of the lens barrel to engage and disengage said groove and adapted to engage said groove on opposite sides of the barrel and having cam engagement with said groove, spring means yieldably urging said latch means into engaging position, means whereby said latch means is manually operable into disengaging position, and means predeterminately fixing said lens barrel angularly with reference to said base member when the lens barrel is mounted thereon.

5. In a device of the character described the combination with a base member provided with a lens aperture and a forwardly facing seating surface associated therewith, of a lens barrel engageable in said aperture and provided with a rearwardly facing shoulder disposed forwardly of the rear end thereof and engageable against said seat, said lens barrel being provided with a circumferential groove disposed rearwardly from said shoulder, latch means associated with said base member and comprising two latch members pivotally mounted for independent movement in a plane normal to the axis of said aperture and adapted to engage and disengage said groove at substantially diametrically opposite points.

6. In a device of the character described the combination with a base member provided with a lens seat, of a lens barrel engageable on said seat and provided with a circumferential groove, latch means associated with said base member and comprising two latch members pivotally mounted intermediately thereof for independent movement in a plane normal to the axis of the lens barrel on said seat and adapted with corresponding ends thereof to engage and disengage said groove at substantially diametrically opposite points, spring means yieldably urging said latch members oppositely into engaging positions, the other ends of said latch members being manually operable toward each other to move said latch members into disengaging position.

7. In a device of the character described the combination with a front wall of a photographic camera and a front plate disposed in front of said wall and fixed therewith and provided with a lens aperture and a forwardly facing lens seat associated with said aperture, of a lens barrel engageable in said aperture and provided with a rearwardly facing shoulder disposed forwardly of the rear end thereof and engageable against said seat, said lens barrel being provided with an external latch recess formation disposed rearwardly from said shoulder, and latch means disposed between said front wall and said front plate and movable to engage and disengage said recess formation.

8. In a device of the character described the combination with a front wall of a photographic camera and a front plate disposed in front of said wall and fixed therewith and provided with a lens aperture and a forwardly facing lens seat surrounding said aperture, of a lens barrel engageable in said aperture and provided with a rearwardly facing shoulder disposed forwardly of the rear end thereof and engageable against said seat, said lens barrel being provided with a circumferential groove disposed rearwardly of said shoulder, latch means disposed between said front wall and said front plate and comprising two latch members pivotally mounted intermediately thereof for independent movement in a plane normal to the axis of said aperture and adapted with corresponding ends thereof to engage and disengage said groove at substantially diametrically opposite points, spring means between said wall and plate and yieldably urging said latch members oppositely into engaging position, the other ends of said latch members being manually operable toward each other to move said latch members into disengaging position.

9. A lens barrel provided with a rearwardly facing seating shoulder disposed forwardly of the rear end thereof and provided with an external latch recess formation disposed rearwardly from said shoulder.

10. A lens barrel provided with a rearwardly facing seating shoulder disposed forwardly of the rear end thereof and provided with an external latch recess formation disposed rearwardly from said shoulder and further provided with a formation adapted for angularly fixing the barrel on a suitable mounting.

11. A lens barrel provided with a rearwardly facing seating shoulder disposed forwardly of the rear end thereof and provided with a circumferential groove disposed rearwardly from said shoulder and a recess in the rearwardly facing surface of said shoulder adapted for angularly fixing the barrel on a suitable mounting.

12. In a lens mount the combination with a base member provided with a lens aperture and a forwardly facing lens seat surrounding said aperture, of latch means associated with said base member and comprising two latch members pivotally mounted intermediately thereof for independent movement in a plane normal to the axis of said aperture and adapted with corresponding ends thereof to engage and disengage a circumferential groove in a lens barrel engaged in said aperture rearwardly of said seat, spring means yieldably urging said latch members oppositely into engaging position, said base member being provided with an opening overlying the other ends of said latch members, and forward extensions on said other ends of said latch members and projecting into said opening for manual engagement to move said latch members into disengaging position.

13. In a lens mount the combination with a base member provided with a lens aperture and a forwardly facing lens seat surrounding said aperture, of latch means associated with said base member and movable to engage and disengage an external latch recess in a lens barrel engaged in said aperture rearwardly of said seat, and a formation on said base member and associated with said seat adapted for angularly fixing a lens barrel engaged in said aperture and on said seat.

14. In a lens mount the combination with a base member provided with a lens aperture and a forwardly facing lens seat surrounding said aperture, of latch means associated with said base member and movable to engage and disengage a circumferential groove in a lens barrel engaged in said aperture rearwardly of said seat, and a lug on said base member and projecting forwardly at said seat and adapted for angularly fixing a lens barrel engaged in said aperture and on said seat.

ALBERT S. HOWELL.